United States Patent [19]

Barford et al.

[11] 4,128,484

[45] Dec. 5, 1978

[54] FABRIC SOFTENING COMPOSITIONS

[75] Inventors: Brian D. Barford, Fairfield; Lawrence Benjamin, Cincinnati, all of Ohio

[73] Assignee: The Procter & Gamble Company, Cincinnati, Ohio

[21] Appl. No.: 595,632

[22] Filed: Jul. 14, 1975

[51] Int. Cl.[2] ........................ C09K 3/16; D06M 13/36

[52] U.S. Cl. ........................................ 252/8.8; 252/8.6; 252/8.9; 260/DIG. 19; 260/DIG. 20; 427/242

[58] Field of Search ........................ 252/8.6, 8.7, 8.75, 252/8.8, 8.9; 427/242; 260/DIG. 19, DIG. 20

[56] References Cited

U.S. PATENT DOCUMENTS

| | | | |
|---|---|---|---|
| 2,461,043 | 2/1949 | Eisen | 428/393 |
| 2,665,443 | 1/1954 | Simon et al. | 15/159 |
| 2,735,790 | 2/1956 | Waitkus | 428/394 |
| 3,793,196 | 2/1974 | Okazaki et al. | 252/8.8 |
| 3,843,395 | 10/1974 | Morton | 427/272 |
| 3,936,537 | 2/1976 | Baskerville et al. | 427/242 |
| 4,022,938 | 5/1977 | Zaki et al. | 427/242 |
| 4,045,361 | 8/1977 | Watt, Jr. et al. | 252/8.8 |

FOREIGN PATENT DOCUMENTS

| | | |
|---|---|---|
| 2210087 | 9/1973 | Fed. Rep. of Germany. |
| 2318323 | 11/1973 | Fed. Rep. of Germany. |
| 2318324 | 11/1973 | Fed. Rep. of Germany. |
| 2312818 | 9/1974 | Fed. Rep. of Germany. |
| 2413042 | 10/1974 | Fed. Rep. of Germany. |
| 1370871 | 10/1974 | United Kingdom. |

*Primary Examiner*—Thomas De Benedictis, Sr.
*Attorney, Agent, or Firm*—Jerry J. Yetter; Richard C. Witte; Julius P. Filcik

[57] ABSTRACT

An aqueous emulsion comprising a fatty alkyl ester of a polyhydric alcohol and a cationic surfactant provides a fabric softening composition of unexpected efficacy. In particular, the use of a sorbitan ester with a cationic surfactant provides a softening agent which deposits effectively onto fabric from an aqueous bath.

16 Claims, No Drawings

FABRIC SOFTENING COMPOSITIONS

BACKGROUND OF THE INVENTION

This invention relates to fabric softening compositions and, in particular, to the compositions in the form of an aqueous emulsion or dispersion.

It has long been recognized that certain chemical compounds have the capability of imparting softness to textile fabrics. These compounds, which are known generally as "softening agents," "fabric softeners," or "softeners," have been used both by the textile industry and by housewives in the laundry to soften a finished fabric, thereby making the fabric smooth, pliable and fluffy to handle. In addition to the quality of softness, the fabrics frequently have a reduced tendency to static cling and are easier to iron.

The softening agents which are usually employed in compositions intended for use by the housewife are cationic surfactant compounds, commonly quaternary ammonium compounds having at least two long alkyl chains, for example distearyl dimethyl ammonium chloride. The positive charge on the softening compound encourages its deposition onto the fabric substrate, the surface of which is usually negatively charged.

However, although the above mentioned cationic compounds are highly effective softeners when applied in a rinse solution, there are certain disadvantages associated with their use. For example, the cationic compounds having long alkyl chains are very sensitive to carry over of anionic detergent into the rinse. Thus, carry over of anionic detergent tends to neutralize the softening effect because the anionic-cationic complex tends to precipitate out of solution. Also, certain cationic surfactant compounds are expensive and in short supply and it is therefore desirable, for commercial reasons, to provide softening compositions having a reduced amount of cationic surfactant compound. Furthermore, softening compositions which comprise predominantly long chain cationic compounds have the disadvantage that the treated fabrics tend to become overloaded with softener and become discolored, greasy or undesirably non-absorbent.

While certain nonionic compounds have been proposed as fabric softening agents, it has been found that these deposit only very inefficiently from aqueous solution because of their lack of positive charge, and in order to obtain effective utilization of such compounds it is necessary to use them in conjunction with an automatic clothes dryer. The relatively high temperature of the drying process assists the nonionic softener compound to spread over the fabric surface as a melt. It has not heretofore been possible to utilize such compounds effectively in a rinse-added softener composition.

It is an object of the present invention to provide softening compositions which employ nonionic softeners and which provide excellent deposition onto the fabric surface from aqueous solution.

This and other objects are achieved by means of a composition which includes nonionic and cationic compounds in specific proportions and is in the form of an aqueous emulsion or dispersion suitable for rinse-added use.

DESCRIPTION OF THE PRIOR ART

Various compounds containing hydroxyl groups are recognized as useful fabric scrooping agents in aqueous media, e.g., those listed in Speel et al., *Textile Chemicals*

*and Auxiliaries,* 2nd Edition, Reinhold Publising Corp., 1957. Some ethoxylated alcohols are further known to be useful in textile lubricating compositions (See Cohen, et al., U.S. Pat. No. 3,773,463, issued Nov. 20, 1973.)

The use of various sorbitan ester compounds or derivatives to treat fabrics is known (See Atlas Powder Compay Bulletin No. 9, "Industrial Emulsions with Atlas Surfactants," 1953; Eisen, U.S. Pat. No. 2,461,043, issued Feb. 8, 1949; Simon et al., U.S. Pat. No. 2,665,443, issued Jan. 12, 1954; Karg. U.S. Pat. No. 3,652,419, issued Mar. 28, 1972 and Crossfield, U.S. Pat. No. 3,827,114, issued Aug. 6, 1974).

U.S. Pat. No. 3,793,196, issued Feb. 19, 1974 to Okazaki and Miamura, relates to a softening composition in emulsion form, the active softening ingredients being a quaternary ammonium salt and a higher alcohol, and a nonionic emulsifier system comprising sorbitan fatty acid ester and a polyoxyethylene alkyl ether being used to stabilize and adjust the viscosity of the emulsion.

U.S. Pat. No. 2,735,790, issued Feb. 21, 1956 to Waitkus, discloses a relatively complex, 4-component system including nonionic esters and a specific type of quaternary ammonium compound, the system being useful for treating polyacrylonitrile fibers.

The co-pending U.S. Pat. applications of Murphy, et al., Ser. No. 543,606, filed Jan. 23, 1975 abandoned in favor of continuation application Ser. No. 730,910, Oct. 8, 1976, now U.S. Pat. No. 4,085,052, and divisional application 720,176, Sept. 3, 1976, and Zaki, Ser. No. 543,607, filed Jan. 23, 1975, now U.S. Pat. No. 4,022,938 relate to articles for addition to a clothes dryer, the articles being impregnated with or otherwise containing sorbitan esters, or mixtures of sorbitan esters with cationic compounds. The co-pending application of Haug, et al., Ser. No. 520,186, filed Nov. 1, 1974 relates to the use of particulate sorbitan esters in a composition for conditioning fabrics.

SUMMARY OF THE INVENTION

The present invention is based on the discovery that the deposition of certain nonionic softeners such as sorbitan esters onto fabrics can be markedly increased if the softener is combined with certain cationic surfactant compounds in the form of an emulsion or dispersion. While not intending to be limited by theory, it appears that, when the appropriate nonionic softener and the appropriate cationic compounds are emulsified together, emulsion particles are formed which have a suitable positive charge distribution on their outer surface for good deposition onto fabrics to occur.

According to the present invention, a softening composition is provided in the form of an aqueous dispersion, the particles of the disperse phase being characterized by an average particle size of less than about 4 microns in diameter and said particles consisting essentially of at least about 30% of a fatty acid partial ester of a polyhydric alcohol or anhydride thereof having from 3 to about 8 carbon atoms and at least about 5% of a cationic surfactant selected from $C_8$–$C_{25}$ alkyl imidazolinium salts, $C_{12}$–$C_{20}$ alkyl pyridinium salts, and noncyclic quaternary ammonium salts having at least one $C_{12}$–$C_{30}$ alkyl chain.

In highly preferred embodiments of the invention, the cationic surfactant includes a quaternary ammonium salt having only a single long alkyl chain, preferably having from 12 to 22 carbon atoms. Such preferred embodiments can additionally include a cationic material having two $C_{12}$–$C_{30}$ alkyl chains.

DETAILED DESCRIPTION OF THE INVENTION

The composition of the present invention comprises components which are described more fully hereinafter. All percentages herein are by weight, unless otherwise specified.

The Nonionic Softener

The essential softening agent of the present invention is a nonionic softener which is a fatty acid partial ester of a polyhydric alcohol or anhydride thereof having from 3 to about 8 carbon atoms. It is preferred that the fatty acid ester has at least 2 free (i.e., unesterified) hydroxyl groups and at least 1, more preferably at least 2, fatty acyl groups.

The polyhydric alcohol portion of the ester can be glycerol, diglycerol, xylitol, sucrose, erythritol, pentaerythritol, sorbitol or sorbitan; sorbitan esters are particularly preferred.

The fatty acid portion of the ester normally comprises a fatty acid having from 12 to 20 carbon atoms, typical examples being lauric acid, myristic acid, palmitic acid, stearic acid and behenic acid.

The most highly preferred group of softening agents for use in the present invention is the sorbitan esters, which are esterified dehydration products of sorbitol.

Sorbitol, itself prepared by the catalytic hydrogenation of glucose, can be dehydrated in well known fashion to form mixtures of 1,4- and 1,5- sorbitol anhydrides and small amounts of isosorbides. (See Brown, U.S. Pat. No. 2,322,821, issued June 29, 1943.)

The foregoing type of complex mixtures of anhydrides of sorbitol are collectively referred to herein as "sorbitan." It will be recognized that this "sorbitan" mixture will also contain some free, uncyclized sorbitol.

The softening agents of the type employed herein can be prepared by esterifying the "sorbitan" mixture with a fatty acyl group in standard fashion, e.g., by reaction with a fatty acid halide or fatty acid. The esterification reaction can occur at any of the available hydroxyl groups, and various mono-, di-, etc., esters can be prepared. In fact, mixtures of mono-, di, tri-, etc., esters almost always result from such reactions, and the stoichiometric ratios of the reactants can be simply adjusted to favor the desired reaction product.

For commercial production of the sorbitan ester materials, etherification and esterification are generally accomplished in the same processing step by reacting sorbitol directly with fatty acids. Such a method of sorbitan ester preparation is described more fully in MacDonald; "Emulsifiers:" Processing and Quality Control:, *Journal of the Americal Oil Chemists' Society, Volume* 45, October 1968.

The mixtures of hydroxy-substituted sorbitan esters useful herein contain, inter alia, compounds of the following formulae, as well as the corresponding hydroxy-substituted di-esters:

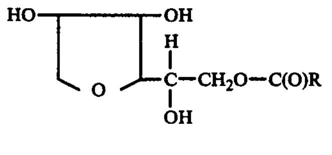

and

-continued

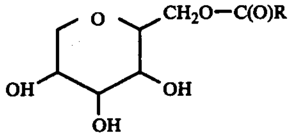

and

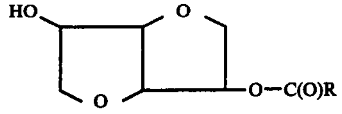

wherein the group R is a $C_{10}$–$C_{26}$, and higher, fatty alkyl residue. Preferably this fatty alkyl residue contains from 16 to 22 carbon atoms. The fatty alkyl residue can, of course, contain non-interfering substituents such as hydroxyl groups. Esterified hydroxyl groups can, of course, be either in terminal or internal positions within the sorbitan molecule The foregoing complex mixtures of esterified dehydration products of sorbitol (and small amounts of esterified sorbitol) are collectively referred to herein as "sorbitan esters." Sorbitan mono- and di-esters of lauric, myristic, palmitic, stearic and behenic (docosanoic) acids are particularly useful herein as softening agents and also can provide an anti-static benefit to fabrics. Mixed sorbitan esters, e.g., mixtures of the foregoing esters, and mixtures prepared by esterifying sorbitan with fatty acid mixtures such as the mixed tallow fatty acids, are useful herein and are economically attractive. Unsaturated $C_{10}$–$C_{22}$ sorbitan esters, e.g., sorbitan monooleate, usually are present in such mixtures in low concentration. The term "alkyl" as employed herein to describe the sorbitan esters encompasses both the saturated and unsaturated hydrocarbyl ester side chain groups.

Certain derivatives of the sorbitan esters herein, especially the "lower" ethoxylates thereof (i.e., mono-, di- and tri-esters wherein one or more of the unesterified —OH groups contain one to about twenty oxyethylene moieties [Tweens ®] are also useful in the composition of the present invention. Therefore, for purposes of the present invention, the term "sorbitan ester" includes such derivatives.

Preparation of the sorbitan esters herein can be achieved by dehydrating sorbitol to form a mixture of anhydrides of the type set forth above, and subsequently esterifying the mixture using, for example, a 1:1 stoichiometry for the esterification reaction. The esterified mixture can then be separated into the various ester components. Separation of the individual ester products is, however, difficult and expensive. Accordingly, it is easier and more economical not to separate the various esters, using instead the esterified mixture as the sorbitan ester component. Such mixtures of esterified reaction products are commercially available under various tradenames, e.g., Span ®. Such sorbitan ester mixtures can also be prepared by utilizing conventional interesterification procedures.

For the purposes of the present invention, it is preferred that a significant amount of di- and tri- sorbitan esters are present in the ester mixture. Ester mixtures having from 20%-50% mono-ester, 25%-50% di-ester and 10%-35% of tri- and tetra-esters are preferred.

The material which is sold commercially as sorbitan mono-ester (e.g. mono-stearate) does in fact contain significant amounts of di- and tri-esters and a typical analysis of sorbitan monostearate indicates that it comprises ca. 27% mono-, 32% di- and 30% tri- and tetra esters. Commercial sorbitan mono-stearate therefore is a preferred material. Mixtures of sorbitan stearate and sorbitan palmitate having stearate/palmitate weight ratios varying between 10:1 and 1:10, and 1,5-sorbitan esters are useful. Both the 1,4- and 1,5- sorbitan esters are useful herein.

Other useful alkyl sorbitan esters for use in the softening compositions herein include sorbitan monolaurate, sorbitan monomyristate, sorbitan monopalmitate, sorbitan monobehenate, sorbitan monooleate, sorbitan dilaurate, sorbitan dimyristate, sorbitan dipalmitate, sorbitan distearate, sorbitan dibehenate, sorbitan dioleate, and mixtures thereof, and mixed tallowalkyl sorbitan mono- and di-esters. Such mixtures are readily prepared by reacting the foregoing hydroxy-substituted sorbitans, particularly the 1,4- and 1,5-sorbitans, with the corresponding acid or acid chloride in a simple esterification reaction. It is to be recognized, of course, that commercial materials prepared in this manner will comprise mixtures usually containing minor proportions of uncyclized sorbitol, fatty acids, polymers, isosorbide structures, and the like. In the present invention, it is preferred that such impurities are present at as low a level as possible.

It is also to be recognized that the sorbitan esters employed herein can contain up to about 15% by weight of esters of the $C_{20}$–$C_{26}$, and higher, fatty acids, as well as minor amounts of $C_8$, and lower, fatty esters. The presence or absence of such contaminants is of no consequence in the present invention.

Other fatty acid partial esters useful in the present invention are xylitol monopalmitate, pentaerythritol mono- stearate, sucrose monostearate and glycerol monostearate. As with the sorbitan esters, commercially available mono-esters normally contain substantial quantities of di- or tri- esters.

The above discussed nonionic compounds are correctly termed "softening agents", because, when the compounds are correctly applied to a fabric, they do impart a soft, lubricious feel to the fabric. However, it has not heretofore been found possible to apply such compounds from a dilute, aqueous rinse solution to fabrics in such a way that adequate deposition is obtained. The present invention provides a means whereby good deposition of the above compounds can be achieved through their combination with certain cationic surfactants which are discussed in greater detail below.

The Cationic Surfactant

The cationic surfactants useful in the present invention are selected from the group consisting of noncyclic quaternary ammonium salts of the general formula $R_1 R_2 R_3 R_4 N^{\oplus} X^{\ominus}$, wherein groups $R_1$, $R_2$, $R_3$ and $R_4$ are, for example, alkyl or substituted alkyl, and X is an anion, for example chloride, bromide, methyl sulfate, etc., alkyl imidazolinium salts wherein at least 1 alkyl group contains a $C_8$–$C_{25}$ carbon chain and alkyl pyridinium salts having a $C_{12}$–$C_{20}$ alkyl chain.

Morpholinium salts are not contemplated for use herein.

It will be understood that the main function of the cationic surfactant is to encourage deposition of softener and it is not, therefore, essential that the cationic surfactant itself have substantial softening properties, although this may be the case. Indeed, it is preferred that at least a part of the cationic component of the composition comprises a surfactant having only a single alkyl chain, as such compounds have greater solubility in water and can more effectively provide the appropriate positive charge distribution and the degree of hydration on the surface of the emulsified nonionic softener particle.

Thus, it is preferred that the cationic surfactant have a single $C_{12}$–$C_{22}$, preferably $C_{14}$–$C_{18}$, alkyl group.

Highly preferred cationic surfactants are the quaternary ammonium salts of the formula

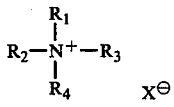

wherein group $R_1$ is $C_{12}$–$C_{22}$, preferably $C_{16}$–$C_{18}$ fatty alkyl and groups $R_2$, $R_3$ and $R_4$ are each $C_1$–$C_4$ alkyl, preferably methyl, and the counterion X is as above.

Also useful in the present invention are diquaternary ammonium salts of the above general formula wherein group $R_1$ is $C_{12}$–$C_{20}$ fatty alkyl, preferably $C_{16}$–$C_{18}$ alkyl, groups $R_2$ and $R_3$ are each $C_1$–$C_4$ alkyl, preferably methyl, and $R_4$ is the group $R_{10}$ $R_{11}$ $R_{12}$ $R_{13}$ $N^{\oplus}$ $X^{\ominus}$ wherein $R_{10}$ is $C_2$–$C_8$, preferably $C_3$–$C_4$, alkylene; $R_{11}$, $R_{12}$ and $R_{13}$ are each $C_1$–$C_4$ alkyl, preferably methyl; and X is an anion, for example, a halide. These diquaternary ammonium salts can, in certain circumstances, provide additional positive charge at the particle surface, and thereby improve deposition.

The conventional quaternary ammonium softening agents of the above formula wherein $R_1$ and $R_2$ are each $C_{12}$–$C_{20}$ fatty alkyl and $R_3$ and $R_4$ are each $C_1$–$C_4$ alkyl, do function to a certain extent in the same way as the preferred single long alkyl chain compounds, but preferably in the present invention such softening agents are used in conjunction with the preferred cationic surfactants.

Alkyl imidazolinium salts useful in the present invention have cations of the general formula

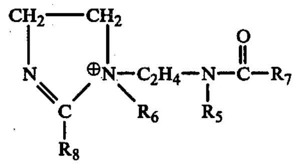

wherein $R_6$ is a $C_1$–$C_4$ alkyl radical, $R_7$ is hydrogen or a $C_1$–$C_4$ alkyl radical, $R_8$ is a $C_8$–$C_{25}$ alkyl radical and $R_5$ is hydrogen or a $C_8$–$C_{25}$ alkyl radical. Alkyl pyridinium salts useful in the present invention have cations of the general formula

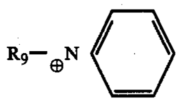

wherein $R_9$ is a $C_{12}$–$C_{20}$ alkyl radical. A typical useful material of this type is cetyl pyridinium chloride.

In many practical cases, it is advantageous to use a 3-component composition comprising a nonionic softener, a cationic surfactant such as cetyl trimethylammonium bromide, and a cationic softener such as ditallowdimethylammonium chloride. The cationic softener, as well as providing additional softening power, also acts as a reservoir of positive charge, so that any anionic surfactant which is carried over into the rinse solution from a conventional washing process is effectively neutralized and does not upset the positive charge distribution on the surface of the emulsified nonionic softener particles.

Optional Ingredients

Adjuvants can be added to the composition herein at usual levels for their known purposes. Such adjuvants include emulsifiers, perfumes, preservatives, germicides, viscosity modifiers, colorants, dyes, fungicides, stabilizers, brighteners, and opacifiers. These adjuvants, if used, are added at their conventional low levels (e.g., from about 0.5% to 5% by weight). The present compositions should not, of course, contain any material (e.g., anionics) which chemically interferes with the functioning of the essential composition components.

Composition Formulation

The compositions of the present invention are in the form of aqueous dispersions, and the particles of the disperse phase must comprise at least 30% of the nonionic softener and at least 5% of the cationic surfactant. Also, the emulsified particles must have an average particle size of less than about 4 microns, preferably less than about 2 microns, and more preferably from about 0.1 to 1 microns, in order that effective deposition onto fabrics is achieved. The term "average particle size", in the context of this specification, means a number average particle size, i.e. more than 50% of the particles have a diameter less than the specified size. In highly preferred embodiments of the invention, substantially all (i.e., at least about 80%) of the disperse phase comprises the above-discussed two components, namely (a) the nonionic softener and (b) one or more cationic surfactants. However, it is possible for the disperse phase to include other non-interfering components, for example other nonionic softeners. Such other components will then form the balance of the disperse phase after incorporation of the essential components discussed above.

Two types of softening compositions are particularly preferred in the present invention and these will be discussed separately below.

The first type has a 2-component disperse phase in which from about 70% to 95% of the nonionic softener, preferably sorbitan ester, is combined with from about 30% to about 5% of a cationic surfactant of the formula $R_1 R_2 R_3 R_4 N^{\oplus} X^{\ominus}$ wherein $R_1$ is $C_{12}$–$C_{20}$ alkyl, $R_2$, $R_3$ and $R_4$ are each $C_1$–$C_4$ alkyl or hydroxyalkyl, preferably methyl, and X is an anion, preferably chloride, bromide or methyl sulfate.

The compositions of the above type provide very effective softening compositions at relatively low levels of cationic surfactants, and these compositions are therefore especially preferred. Such compositions, however, do have the potential disadvantage that the relatively small amount of cationic surfactant makes the composition very sensitive to contamination by anionic detergent which may be carried over into the rinse bath in an automatic washer. As will be clearly appreciated, it is essential for good deposition onto fabrics that sufficient un-contaminated cationic surfactant is present in the rinse solution to provide an adequate degree of positive charge on the surface of the emulsified nonionic particles. This potential disadvantage is obviated in the compositions of the second preferred type which are discussed below.

The second type of preferred composition employs a 3-component disperse phase comprising a nonionic softener, preferably sorbitan ester, a cationic surfactant having single long alkyl chain and a cationic surfactant having 2 long alkyl chains. Preferred cationic surfactants are cetyl-trimethylammonium bromide, and ditallowdimethylammonium chloride. Preferred compositions of this type have a disperse phase comprising from about 40% to about 80% of sorbitan ester, from 2% to 20% of cetyl trimethylammonium bromide and from 10% to 55% of ditallowdimethylammonium chloride.

Compositions of both the above types are prepared in aqueous solution and normally it is a simple matter of mixing the ingredients together in water, heating to a temperature of about 60° C. and agitating for 5–30 minutes. In the case of the three-component mixture, it is more preferred to pre-mix the nonionic softener and the more soluble (i.e. single alkyl chain) cationic compound before mixing in a melt of the di- alkyl cationic compound. This procedure leads to an aqueous emulsion having particles of an average size of less than 4 microns, the particles being positively charged at their surface. Depending upon the particular selection of nonionic softener and cationic surfactant, it may be necessary in certain cases to include other emulsifying ingredients (e.g., common ethoxylated alcohol nonionics) or to employ more efficient means for dispersing and emulsifying the particles (e.g., high speed blender).

Normally, at 60° C., the softening agents exist in liquid form and therefore form true emulsions with an aqueous continuous phase. On cooling, the disperse phase may wholly or partially solidify so that the final composition exists as a dispersion which is not a true liquid/liquid emulsion. It will be understood that the term "dispersion" means liquid/liquid phase or solid/liquid phase dispersions and emulsions.

For normal use as rinse-added compositions, the disperse phase comprises 3–20%, preferably 4–10% of the composition. Compositions of the present invention are normally used at about 0.05–0.5% concentration in the rinse cycle of a washing machine to give an effective concentration of active softening agent of about 25–200 ppm.

The following exemplifies the aqueous fabric softening compositions of the present invention and the benefits obtained by using such compositions.

EXAMPLE I

Sorbitan mono-stearate (prepared by the reaction of sorbitol with stearic acid), 5 g., and cetyl trimethyl ammonium bromide, 0.5 g., were added to water, 100 ml., and the mixture was heated with stirring to 60° C. An aqueous emulsion was observed to form and after cooling to room temperature, the composition remained in an emulsified or dispersed form.

EXAMPLE II

Sorbitan non-stearate, 2.5 g., and cetyl trimethyl ammonium bromide, 0.25 g., were added to water, 100 ml., and the mixture was heated with stirring to 60° C. After formation of an emulsion, ditallowalkyl dimethyl ammonium chloride, 2.25 g., was added and stirring was continued for several minutes. A stable, emulsified aqueous composition was obtained.

EXAMPLE III

Sorbitan monostearate, 2.5 g., and ditallowalkyl dimethyl ammonium chloride, 2.5 g., were added to water, 100 ml., and the mixture was heated to 60° C. with agitation. An aqueous emulsion was formed which remained stable after cooling to room temperature.

The above compositions can be prepared using mixtures of water (ca. 90–95%) and $C_1$–$C_4$ monohydric alcohols (methanol, ethanol, etc.).

The above three compositions were tested for their fabric softening activity in the following ways.

(A) Fabric Deposition

Some measure of the effectiveness of fabric softening compositions can be obtained by determining the amount of active softening material which is deposited on to the fabric. This can be done by measuring the depletion of active material from a rinse bath containing softening agent and a fabric substrate.

The above compositions were tested in this manner by agitating terry towelling test cloths for 15 minutes in aqueous rinse baths containing 100 ppm of active softening agent. The test cloths were then removed from the bath, excess water squeezed out and the cloths were then allowed to dry at room temperature overnight. The percentage depletion of active in the test solution for each of the exemplified compositions was measured against control solutions containing, respectively, sorbitan monostearate (SMS) alone and ditallowdimethylammonium chloride (DTDMAC) alone. The results obtained are tabulated below.

| COMPOSITION | % ACTIVE DEPLETION |
|---|---|
| Sorbitan monostearate | 17 |
| DTDMAC | 71 |
| Example I | 70 |
| Example II | 85 |
| Example III | 63 |

As can be seen from the table, the exemplified compositions deposit active agent onto fabric at least as well as the conventional DTDMAC active and very much better than sorbitan ester alone.

(B) Subjective Evaluation

A subjective evaluation of softness was carried out using conditions identical to those described above, but evaluating the softness of the terry towelling test cloths by means of a panel of expert graders. Comparisons between different cloths are expressed in terms of panel score units (PSU) where

| | | | |
|---|---|---|---|
| 0 | PSU | = | No difference |
| 1 | " | = | Small difference |
| 2 | " | = | Moderate difference |
| 3 | " | = | Large difference |
| 4 | " | = | Very large difference |

In this test, a 5% DTDMAC treatment was used as a control and the softening performances of the individual materials used in the compositions of the present invention were also measured. The following table shows the results. Negative PSU values indicate that the test cloths were less soft than the control cloths.

| TEST MATERIAL | PSU |
|---|---|
| CTAB | −3.75 |
| SMS | −2.1 |
| DTDMAC | 0.0 |
| Example I | +0.8 |
| Example II | +1.2 |
| Example III | +0.2 |

As can be seen, the compositions of the present invention show a synergistic softening activity when compared with the individual materials making up the compositions.

What is claimed is:

1. A fabric softening composition in the form of an aqueous dispersion, comprising:
   (i) from about 3% to about 20% by weight of a disperse phase comprising
   (a) at least about 30% by weight of a fatty acid partial ester of a polyhydric alcohol or anhydride thereof containing from 3 to about 8 carbon atoms; and
   (b) at least about 5% by weight of a cationic surfactant selected from non-cyclic quaternary ammonium salts having at least one $C_{12}$–$C_{30}$ alkyl chain, $C_8$–$C_{25}$ alkyl imidazolinium salts, and $C_{12}$–$C_{20}$ alkyl pyridinium salts;
   the particles of the disperse phase being characterized by an average particle size of less than about 4 microns, said dispersed particles having a positive charge distribution on the surface thereof; and
   (ii) the balance of the composition comprising a liquid carrier selected from the group consisting of water and mixtures of water and $C_1$–$C_4$ monohydric alcohols.

2. A softening composition according to claim 1 in which the partial ester is a $C_{12}$–$C_{20}$ alkyl ester of sorbitan.

3. A softening composition according to claim 1 in which at least about 80% of the disperse phase comprises the components (a) and (b).

4. A softening composition according to claim 1 wherein the particles of the disperse phase consist essentially of from about 70% to about 95% by weight of a fatty acid partial ester of a $C_3$–$C_8$ polyhydric alcohol, or anhydride thereof, and from about 5% to about 30% by weight of a cationic surfactant of the formula $R_1 R_2 R_3 R_4 N^{\oplus} X^{\ominus}$ wherein $R_1$ is $C_{12}$–$C_{20}$ alkyl; $R_2$, $R_3$ and $R_4$ are each $C_1$–$C_4$ alkyl or hydroxyalkyl; and X is an anion, the particles of the disperse phase being characterized by an average particle size of less than about 2 microns.

5. A softening composition according to claim 4 in which the partial ester of the polyhydric alcohol or anhydride in a member selected from the group consisting of esters of glycerol, diglycerol, xylitol, sucrose, pentaerythritol, sorbitol and sorbitan.

6. A softening composition according to claim 5 in which the partial ester is a member selected from the group consisting of lauric, myristic, palmitic, stearic and behenic acid esters.

7. A softening composition according to claim 6 in which the partial ester is sorbitan monostearate.

8. A softening composition according to claim 4 in which the cationic surfactant is cetyl trimethylammonium halide.

9. A softening composition according to claim 1 wherein the disperse phase comprises: (a) from about 40% to about 80% by weight of a fatty acid partial ester of a $C_3$–$C_8$ polyhydric alcohol or anhydride thereof; (b) from about 2% to about 20% by weight of a cationic surfactant of the formula $R_1 R_2 R_3 R_4 N^{\oplus} X^{\ominus}$ wherein $R_1$ is $C_{12}$–$C_{20}$ alkyl, $R_2$, $R_3$ and $R_4$ are each $C_1$–$C_4$ alkyl or hydroxyalkyl,, and X is an anion; and (c) from about 10% to about 55% by weight of a cationic surfactant of the formula $R_1 R_2 R_3 R_4 N^{\oplus} X^{\ominus}$ wherein $R_1$ and $R_2$ are each $C_{12}$–$C_{22}$ alkyl, $R_3$ and $R_4$ are each $C_1$–$C_4$ alkyl or hydroxyalkyl and X is an anion.

10. A softening composition according to claim 9 in which the partial ester of the polyhydric alcohol or anhydride is a member selected from the group consisting of esters of glycerol, diglycerol, xylitol, sucrose, pentaerythritol, sorbitol and sorbitan.

11. A softening composition according to claim 10 in which the partial ester is a member selected from the group consisting of lauric, myristic, palmitic, stearic and behenic acid esters.

12. A softening composition according to claim 11 in which the partial ester is sorbitan monostearate.

13. A softening composition according to claim 12 in which the cationic surfactant (b) is cetyl trimethylammonium halide.

14. A softening composition according to claim 12 in which the cationic surfactant (c) is a member selected from the group consisting of ditallowalkyl dimethyl ammonium bromide, ditallowalkyl dimethyl ammonium chloride and ditallowalkyl dimethyl ammonium methyl sulfate.

15. A softening composition according to claim 1 in which the disperse phase consists essentially of from about 30% to 95% by weight of a fatty acid partial ester of sorbitan and from about 5% to 70% by weight of a quaternary ammonium halide having two $C_{12}$–$C_{22}$ alkyl groups and two $C_1$–$C_4$ alkyl or hydroxyalkyl groups.

16. A softening composition according to claim 15 wherein the partial ester is sorbitan monostearate, and the cationic surfactant is ditallowalkyl dimethyl ammonium chloride.

* * * * *